United States Patent [19]

Hansen

[11] Patent Number: 4,691,471
[45] Date of Patent: Sep. 8, 1987

[54] HOLDER FOR LEADERS

[76] Inventor: James E. Hansen, 16301 Valley Rd., Eden Prairie, Minn. 55344

[21] Appl. No.: 947,621

[22] Filed: Dec. 30, 1986

[51] Int. Cl.$^4$ ............................................. A01K 97/06
[52] U.S. Cl. ................................................. 43/57.2
[58] Field of Search ...................... 43/57.2, 57.1, 54.1

[56] References Cited

U.S. PATENT DOCUMENTS

| 337,593 | 3/1886 | Levison | 43/57.2 |
|---|---|---|---|
| 1,737,376 | 11/1929 | Knettles | 43/57.2 |
| 2,069,661 | 2/1937 | Tiede | 43/57.2 |
| 2,504,266 | 4/1950 | Knorr | 43/57.2 |
| 2,836,005 | 5/1958 | Jerdee | 43/57.2 |
| 4,005,541 | 2/1977 | Henrichsen | 43/57.2 |

Primary Examiner—Gene P. Crosby

Attorney, Agent, or Firm—Kinney & Lange

[57] ABSTRACT

A holder for fishing leaders which permits organizing a tackle box to hold such leaders and prevent the leaders from being tangled up, and in particular is adaptable for use with leaders of substantial lengths and having spinners, double hooks, bait harnesses and other accessories thereon. The leaders are stored in a compact manner and are quickly accessed. The holder has a plurality of retainers arranged so that the hook has to be fastened to a retainer through a tension link and then the leader extended and wrapped around additional posts, and finally the opposite end of the leader can be coupled to a second retainer. The tension link will provide a tension on the leader and keep it properly positioned. The leader holder can be molded directly into a tackle box or can be made as a separate unit.

18 Claims, 9 Drawing Figures

U.S. Patent  Sep. 8, 1987  Sheet 1 of 3  4,691,471
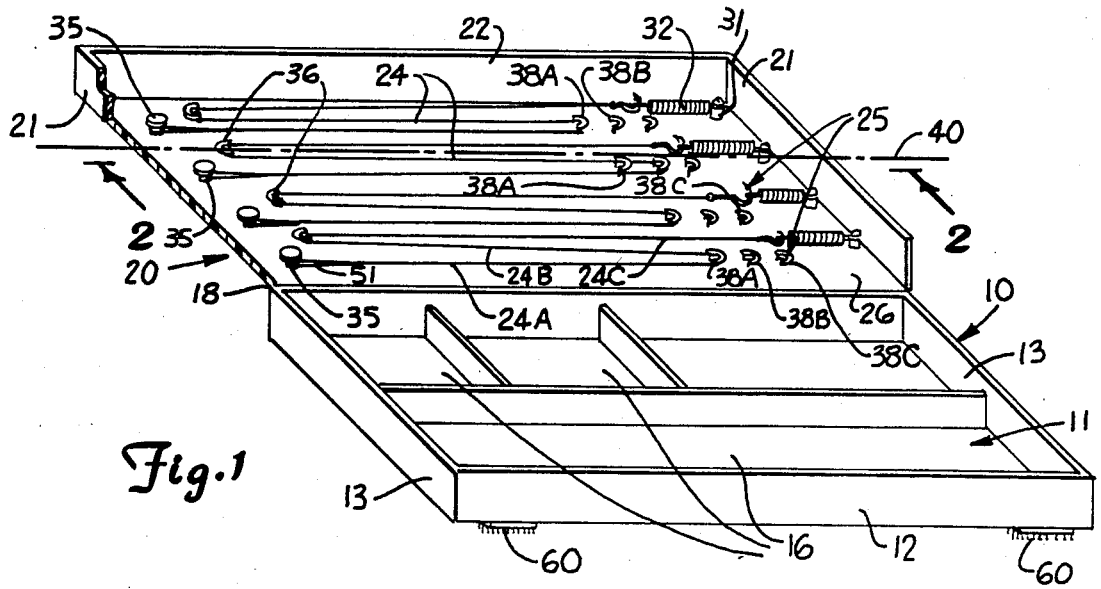
Fig. 1
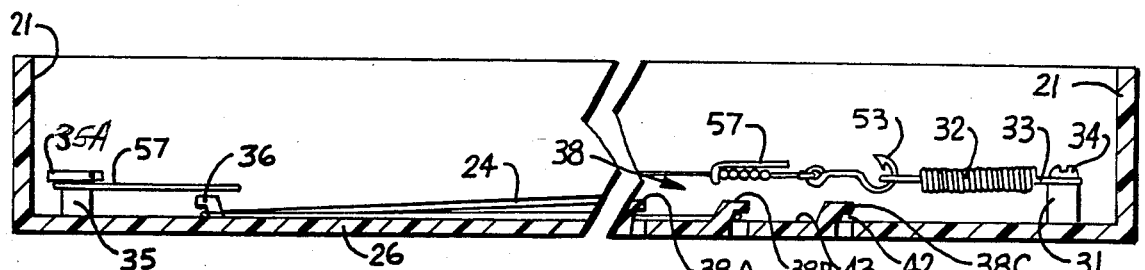
Fig. 2
Fig. 4
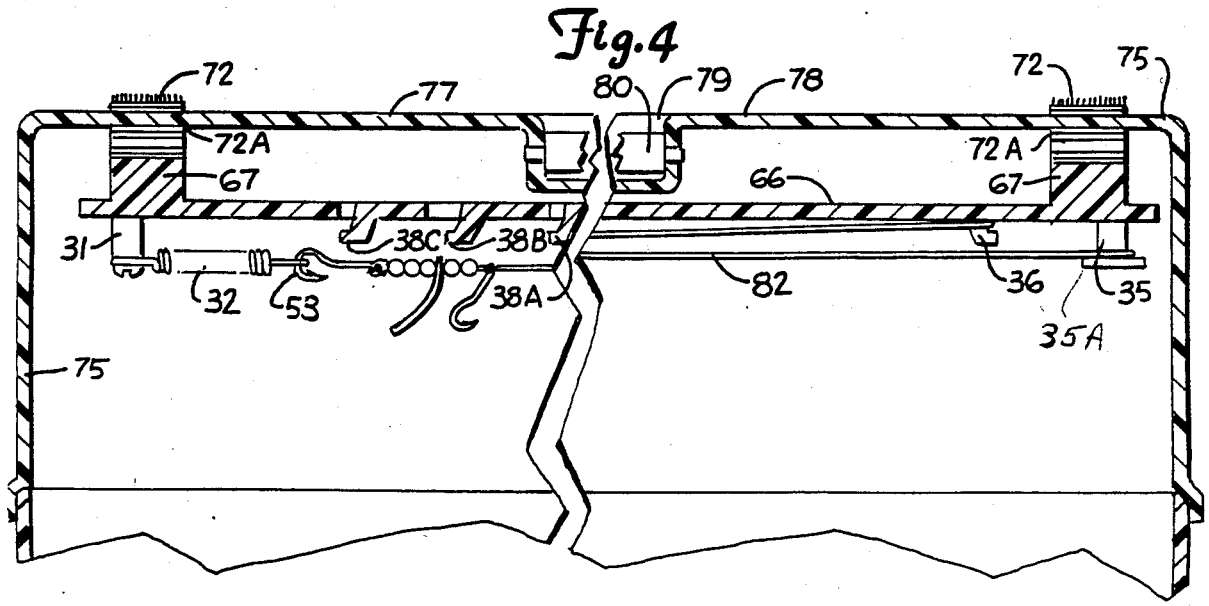

HOLDER FOR LEADERS

BACKGROUND OF THE INVENTION

1. Field of the Invention

The present invention relates to holders for conveniently storing fishing line leaders and similar lines so they will not tangle.

2. Description of Prior Art

Various holders for fishing line leaders have been advanced. For example U.S. Pat. No. 4,200,249 shows a storage device for a leader using a reel or bobbin inside of a case. The leader is wrapped on the bobbin.

Additionally, cards or flat members have been used for wrapping leaders, but long leaders, in the range of 24 to 36 inches in length, and leaders with various accessories in front of the hook assembly become tangled up when placed in a tackle box, so that when the leader is needed substantial time is spent in getting the leader untangled.

SUMMARY OF THE INVENTION

The present invention relates to a holder and organizer for fishing line leaders and other elongated lines that provides for holding different lengths of lines and which maintains each leader under tension and also holds each leader separated from other leaders and accessible for use. As shown, the leader holders can be molded into the top of a tackle box, or mounted onto a separate panel and releasably held (with hook and loop fasteners for example) in any desired location, such as on the side of a boat or on the top of a tackle box where the leaders will be accessible for use. The leader holders may be sold as a kit of components that can be attached to a panel or other support by the user.

The holder comprises a pair of spaced retainers, one of which has a tension spring link to hold the hook end of the leader, and intermediately positioned posts around which the leader can then be wrapped in series. The guide or wrapping posts are positioned so that the leader may be wrapped or threaded over two spaced posts and thus separated into individual lengths, and the end of the leader that normally connects to the fishing line is retained on the second retainer. The spring or tension link holds the leader under tension and prevents it from coming off the posts. The leader is formed in three separate lengths as shown, one extending from the first retainer up to a first post that is spaced from the first retainer, and then back to a second post that is adjacent the first retainer, and then the leader is formed in a length back to the second retainer which is adjacent the first post.

The leader holder preferably is molded of plastic. The parts can be integrally molded with either a large or small tackle box cover. The retainers and posts also can easily be molded into other plastic items as desired. If the tackle box cover has inset handles or other protrusions on the interior, the leader holders can be integrally molded with the wall of the box at any desired level.

The kit form of the invention comprises molded retainers and posts that are loose, but which may be attached to any wall or panel. The leader holder is low cost, easy to use, and very efficient in organzing leaders to prevent undue snarling and entanglement.

BRIEF DESCRIPTION OF THE DRAWINGS

FIG. 1 is a perspective view of a small tackle box having a leader holder made according to the present invention integrally molded in the cover thereof;

FIG. 2 is a sectional view taken as on line 2—2 in FIG. 1;

FIG. 4 is a fragmentary sectional view through the center of the cover of the tackle box of FIG. 3 showing the leader holder positioned on the interior of the tackle box for storage;

DETAILED DESCRIPTION OF THE PREFERRED EMBODIMENT

Figure 3:
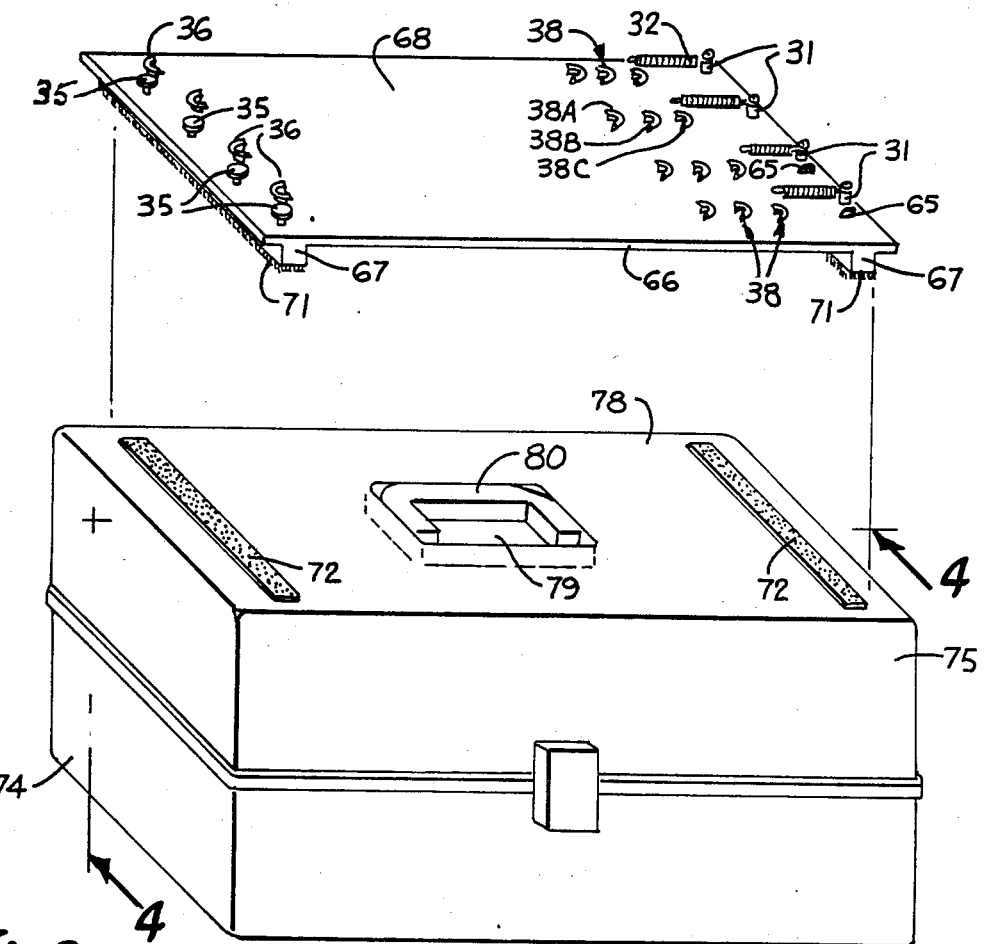
FIG. 3 is a perspective view of a large size tackle box showing a leader holder that is removably positioned onto retainers which hold it on the outside of the tackle box.

Referring to FIG. 1, a typical small tackle box indicated generally at 10 has a base compartment 11, that has side walls 12,12 and end walls 13,13 defining an enclosure, with suitable dividers indicated at 14 to divide the enclosure into selected compartments shown generally at 16. The compartments are for accessories such as hooks, swivels and the like.

A cover member indicated generally at 20 is connected to the base 11 through a suitable hinge portion 18, which can be a plastic hinge formed in a known manner. The cover member 20 as shown has end walls 21 that fit to the outside of the end walls 13, when the cover 20 is closed. The cover member 20 also has a cover lip 22 that fits to the outside of the wall 12 of the base 11, which is opposite from the hinge 18.

The cover member 20 further has a plurality of leader holder assemblies 25 mounted on a planar top wall or panel 26. Each leader holder assembly 25 is designed to hold a single leader 24 and includes a first post like retainer 31 integrally molded with the wall 26. The retainer 31 supports a resilient link or biasing member 32. In the form shown, the link is a tension spring having an end loop 33 that is held in place on the first retainer 31, for example, with a screw 34 that is threaded into the retainer and passes through the spring end loop 33. The spring end loop can be mounted in a groove at the top of the retainer 31 as shown in FIG. 6C, if desired. The link 32 can be elongated substantially to accomodate variations in length of the leaders mounted on the leader holder assemblies, and maintain tension in the leaders. The leader holder assemblies also include a post like second retainer 35 which is integrally molded with wall 26 adjacent one of the end walls 21. Each of the retainers 35 as shown has a lip 35A at the upper end of the retainer. There are four leader holder assemblies 25 shown on wall 26 and thus there are four sets of retainers 31 and 35.

The first and second retainers 31 and 35, respectively, are spaced apart with respect to a bisecting axis 40 (see FIG. 1) that lies between the retainers and each of the first and second retainers forms the end portions of one of the leader holder assemblies 25. Each of the leader holder assemblies includes a first wrapping post or hook 36 adjacent the opposite end of wall 16 from the first retainer 31, and which is thus spaced from the first retainer a selected distance.

In addition, each of the leader holder assemblies is provided with a set of second axially aligned posts or hooks 38, which are aligned on an axis parallel to the bisecting axis 40 that passes between the first and second retainers 31 and 35 and on an opposite side of the axis 40 from the first post 36. The set of posts 38 as shown comprises three posts 38A–38C and each of the posts has an overhanging lip portion that forms a receptacle 42 above the surface 43 of the wall 26. The post 36 also forms an overhanging lip.

The first post 36 is aligned generally in line with the first retainer 31 of each of the leader holder assemblies, and the second posts 38 are generally in alignment with the second retainer 35.

The leader 24 is provided with a loop or other fastener member 51 at one end. This is the end where the leader 24 attaches to a fishing line, and for example with a 30 inch leader 24, the hook 53 on the leader is hooked into a spring eye 55 of the spring link 32 and then threaded over first post 36, then over one of the second posts 38 and then back so the loop or fastener 51 is attached to second retainer 35. The leader will slide on to the post and is held in place under tension by spring link 32 around the first and second posts. The posts 38 and 36 have rounded side surfaces so that the leader 24 will tend to slide when under tension and each of the lengths of the leader which are indicated at 24A, 24B and 24C in FIG. 1 are held taut.

Different ones of the second posts 38 can be used to insure that different length leaders are held taut. For example, the second leader from the hinge 18 as shown in FIG. 1 is a longer leader than the leader closest to the hinge and is fastened over its associated second post 38C and over the first post 36 to take up the additional length of the leader.

The other leaders shown in the other leader holder assemblies 25 can likewise be adjusted in position so that they accommodate the length of the leader.

As shown in FIG. 2, the leader can have a spinner 57 thereon if desired and it will be held separated from other leaders and kept from getting entangled in other leaders or hooks. In FIG. 4, a leader is also shown with a trailing or second hook, and the tension in the leader ensures that such additional hooks are retained properly and do not become entagled. Leaders having beads used for spacing, night crawler harnesses or various bait holders or double spinners are all retained so they do not become tangled up when stored on the holders of the present invention.

The second retainer 35 of each leader holder assembly can be any desired shape or form to hold the line end of the leaders. If some of the leaders do not have loops, the retainers 35 can be used by forming a loop in the end of the leader. In addition, a small friction holder or clamp lock device could be used for holding the leader.

As shown at 60, strips of the hook material for hook and loop fasteners, sold under the trademark VELCRO, can be attached to the underside of the box 10 to permit retaining the box in place on corresponding strips of loop fabric on a box, a seat or in another location. The fasteners are more fully discussed in relation to FIGS. 3 and 4.

In FIGS. 3 and 4, a modified form of the invention is shown, and in this instance, the numbers on the retainers and the posts for the leader holder assemblies will be the same as in FIGS. 1 and 2. The leader holder assemblies indicated at 65 are mounted on a flat wall panel 66 corresponding to the wall 26. The wall panel 66 has integrally molded cross-support ribs 67 adjacent opposite ends thereof on the surface opposite from the upper surface 68 of the panel 66, which has the retainers and posts thereon. Each of the leader holder assemblies 65 includes a first retainer 31, a second retainer 35 and first and second posts or hooks 36 and 38, as previously explained. Posts 36 and 38 can be integrally molded with wall 68 in the same manner as the previously shown posts. Each leader to be held can be hooked onto the end of the spring 32 and then wound around the associated first retainer post 36 and then over the post 38 needed for accomodating the length of the leader. The leader is pulled under tension to stretch the resilient link member or spring 32 which is coupled to retainer 31 and then fastened on the second retainer 35. The leader is thus retained under tension.

As shown, the ribs 65 on the panel have strips of hook portions 71 of hook and loop fasteners sold under the trademark Velcro, and loop or pile material strips 72 for the hook and loop fasteners can be formed into strips as shown on the top of the cover 75 of a tackle box 74. The loop or pile strips 72 are strips of material that are adhesively attached to the upper surface 78 of the top wall 77 of the cover 75 of the tackle box 74 and spaced so they can be aligned with the ribs 67 that carry the Velcro hook strip 71, so that when the fastener strips are pressed pressed together the leader holder assemblies 65 will be held in place on the outside of the tackle box 74.

If desired, the loop or pile material strips 72 can be placed onto the side of a boat, or onto other supports so that the leader holder assemblies 65 and the leaders held in the holder assemblies can be held accessible for the fisherman to use.

As shown in FIG. 4, the leader holder assemblies 65 and the panel 66 can be mounted onto the interior of the top wall 77 of the tackle box for storage by providing loop or pile material strips 72A on the interior of the top wall 77 of cover 75. The ribs 67 on the panel 66 as shown are of height so that the panel will clear the recess 79 for the handle 80 of the tackle box. The panel 66 is held securely on the interior of the tackle box for storage and for transport.

A leader shown at 82 is mounted on the leader holder assembly, and is wound around the first and second posts as previously explained. The leader 82 is shown with two hooks, spacer beads and a spinner.

The leader holder posts and retainers can be molded directly into the top cover wall of a large tackle box alongside the recess for the handle which is formed in the wall, so long as the leaders are clear of any obstructions such as the recess for the handle that is shown.

Figure 5:
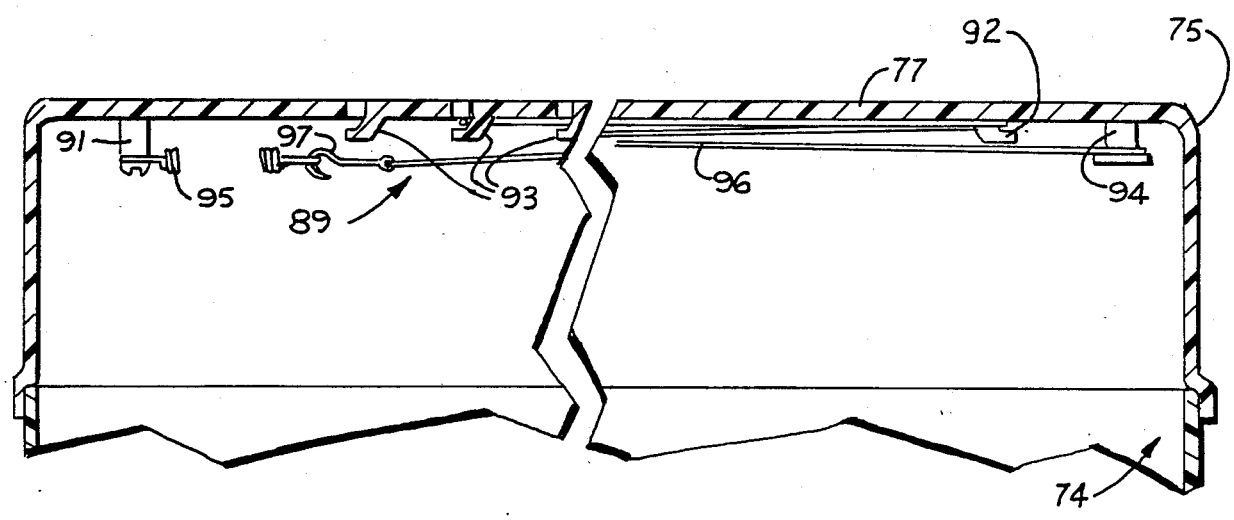
FIG. 5 is a sectional view similar to FIG. 4 showing the components for the leader holder of the present invention integrally molded into a large tackle box cover.

In FIG. 5, a modified sectional view of the tackle box cover is shown. The sectional view extends from end to end of the tackle box parallel to the line for FIG. 4, but offset so that it is to one side of the handle recess. If the leaders are to be threaded or supported in the center portions of the cover where the handle recess is positioned, the retainers and posts can be elongated substantially so that they will hold a leader in position clear of the handle recess on the interior of the box, or the box can be molded in a different manner so that the handle is not recessed.

However, as shown in FIG. 5, the tackle box 74 has a cover 75 as previously explained, with a top wall 77. The top wall 77 of the cover 75 is modified to provide for a leader holder assembly shown in side view at 89, which includes a first retainer 91, corresponding to the retainer 31, a first post 92 and second posts 93A–93C that are integrally molded into the top wall 75. The first post 92 and posts or hooks 93A–93C have rounded side surfaces as previously described to receive a leader 96 that is mounted on the leader holder. The first post 92 is provided adjacent to first retainer 91 for the hook end, and a second retainer 94 is positioned at an opposite end of the cover 75 from the retainer 91. A tension carrying link or spring 95 is provided on the first retainer 91 for receiving the hook 97 of the leader 96.

The leader is mounted to the spring link 95 on the retainer 91 and then mounted over the first and second posts or hooks 92 and 93 as previously explained to hold the leader taut on the leader holder assembly 89.

The molding-in of the retainers 91 and 94 directly into the tackle box cover at the same time as the tackle box is molded, as well as molding-in of the hooks or posts 92 and 93 at appropriate locations, spaced along the length of the tackle box reduces costs. A built-in leader holder (several individual leader holder assemblies can be molded into the tackle box cover) for holding leaders properly organized and keeping them from getting tangled up when in the tackle box is thus provided.

The injection molding process normally carried out for molding parts permits the formation of the necessary elements, and by adding the tension spring link 95 to provide a connecting tension carrying link to the hook 97, the leaders are maintained under tension when they are held on the holder assemblies.

Additionally, the retainers and posts can be made up as a kit, together with a tension carrying link, so that a person can drill holes in the top of a tackle box, for example, and install the kit parts directly either on the interior surface or the exterior surface of the tackle box for holding the leaders taut and in proper position.

Figure 6A:
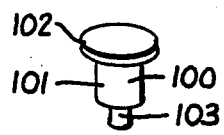
FIGS. 6A, 6B and 6C are perspective views of components used to form a kit for constructing a leader holder of the present invention.
Figure 6B:
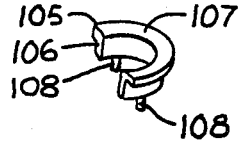
Figure 6C:

FIGS. 6A–6C and FIG. 7 show the kit form of the invention. In this form of the invention, in FIG. 6A, there is a second retainer 100, that has a cylindrical shank 101, and a head 102 of suitable size so that a leader loop can be placed around this retainer and held in place. In addition the cylindrical shank 101 has a pilot pin 103 at its base or outer end that is used for securing the retainer in position when it is installed on a tackle box, or on another suitable panel. FIG. 6B shows a typical retainer post indicated at 105, and in this form of the invention, the retainer posts are formed into part cylindrical walls 106 and having an outer lip 107, to prevent the leaders from slipping upwardly and off. This configuration of posts is also used with prior devices, if desired. The part cylindrical wall 106 of each post has a pair of pins 108 molded to the undersurface thereof, which again form pilot pins for holding the posts in proper position and providing adequate surface for adhesively securing the posts in proper location for holding leaders.

Figure 7:
FIG. 7 is an exploded view of the kit components of FIGS. 6A-6C being installed on a tackle box.
Figure 7:

FIG. 6C shows a first retainer 112, which has a cylindrical shank 113 with an annular groove 114 therein for receiving an end eye of a spring or tension link. The tension link that may be part of the kit is shown in FIG. 7. The first retainer 112 has a pilot pin 115 on its lower end that is also used for locating in a provided opening in a panel on which the retainer is to be mounted and providing an adequate surface for glueing.

In FIG. 7, a fragmentary view of typical panel such as the cover wall 116 of a tackle box is shown. While the retainers are shown as being placed into the upper or outer wall of a tackle box, the parts of the kit can be placed in other locations, as well.

In order to install a leader holder assembly, a plurality of openings indicated at 117 are drilled at proper locations. The openings 117A are for the second retainer post 100, and are of size to receive the pilot pin 103. In addition, there are openings 117B for a first post for holding the leader, and a plurality of sets of openings 117C for mounting a plurality of second posts in line for accomodating different lengths of leaders. Opening 117D is positioned for receiving the pilot pin of a first retainer post 112 which carries the tension spring or link 120, for receiving the hook end of the leader.

The respective first and second posts 105, and retainers 100 and 112 are then adhesively secured or attached in another suitable manner in the openings that are drilled. The kit parts can be attached to a separate panel, a tackle box, or other wall structure to permit winding leaders of selected lengths in position and retaining them under tension with the tension spring or link 120. The threading of the leader is as previously shown.

The kit can be adapted to a wide variety of members. The leader holder assemblies are easy to use, low cost and insure that the leaders are retained in ready to use condition.

Although the present invention has been described with reference to preferred embodiments, workers skilled in the art will recognize that changes may be made in form and detail without departing from the spirit and scope of the invention.

What is claimed is:

1. A kit for a holder of elongated lengths of line having opposite ends used in combination with a support panel that has a generally planar surface in at least one portion, said one portion having spaced opposite ends, the kit comprising:
    a first retainer for mounting at a first of the opposite ends of a panel, and a second retainer for mounting at a second of the opposite ends of a panel, said retainers extending outwardly from such panel and having means for attaching opposite ends of an elongated length of line; and
    a plurality of posts, including, a first post for mounting adjacent the second retainer and in position to substantially align with the first retainer, and being offset from the second retainer, and a second post for mounting adjacent the first retainer in position offset from the first retainer and the first post, whereby when the kit is assembled on a panel an elongated line can be attached with respect to one of the retainers, and then sequentially threaded around the first and second posts, the second end of such line being retained with respect to the second retainer.

2. The kit as specified in claim 1 wherein said posts have lip portions that are spaced from and overlie the support panel on which the kit is assembled.

3. The kit of claim 1 wherein said kit includes a plurality of first and second retainers and a plurality of first and second posts for mounting-in leader holder sets, and further including a resilient tension link for coupling an end of the line to be held to one of the retainers.

4. The kit of claim 1 including a plurality of more than two posts to provide a plurality of posts to comprise a set of second posts.

5. An assembly for holding elongated fishing line leaders having first and second opposite ends comprising:
   a support panel that has a generally planar surface in at least one portion thereof, said support panel portion having spaced opposite ends;
   a first retainer mounted on the panel;
   a second retainer mounted adjacent a second of said opposite ends, said retainers extending outwardly from the support panel and having means for providing attachment of the respective opposite ends of an elongated leader;
   a plurality of posts, including a first post adjacent the second retainer in position to substantially align with the first retainer, and being spaced from the second retainer;
   a second post adjacent the first retainer in position spaced from the first retainer and the first post, whereby the first end of an elongated leader can be attached with respect to one of the retainers, and then threaded around the first and second posts in series; and
   means to retain the second end of such an elongated leader with respect to the second retainer.

6. The apparatus of claim 5 wherein the retainers and posts are integrally molded with the support panel.

7. The apparatus of claim 5 wherein the support panel comprises the cover of a fishing tackle box.

8. The apparatus as specified in claim 5 wherein the first retainer and second retainer are positioned so that a bisecting axis lies between the first and second retainers, and which axis is spaced from each of said first and second retainers and said first and second posts, the first and second posts being spaced from each other in direction along the axis and on opposite sides of the axis.

9. The apparatus as specified in claim 5 and bias means attached to at least one of said retainers for coupling the associated end of a leader to said one retainer.

10. The apparatus of claim 9 wherein said posts are hook shaped to retain a fishing leader threaded over the posts.

11. The apparatus of claim 8 wherein there are a plurality of second posts arranged in alignment with the direction between the first and second retainers, the second posts being spaced selected distances from the first retainer and from each other.

12. A leader holder assembly for elongated fishing leaders comprising a panel having a surface and first and second spaced apart ends, a first retainer mounted adjacent a first end of said panel and a second retainer mounted adjacent a second end of said panel:
    at least one first post spaced from the first retainer in direction toward said second retainer a desired amount;
    at least one second post spaced from the second retainer in direction toward the first retainer a desired amount, said first and second post being positioned offset from each other laterally with respect to the direction between the first and second retainers and substantially aligned with the first and second retainers, respectively;
    means on the first retainer for holding an end of a leader, said leader being capable of being threaded over said first post, back to said second post, and then back toward said second retainer in an opposite direction from the direction leading from the first post to the second post; and
    means to retain the second end of such leader threaded from the first retainer across the first and second posts toward the second retainer on said second retainer, the retainers and posts being positioned on the panel relative to each other so that a leader mounted thereon has a plurality of lengths which do not cross each other.

13. The apparatus as specified in claim 12 wherein said means to retain the second end of the leader comprises a resilent link that is capable of being stretched to receive the second end of said leader and exert a tensile force on a leader that is threaded on the retainers and posts.

14. The apparatus as specified in claim 13 wherein said resilient link comprises a tension spring member.

15. The apparatus as specified in claim 12 wherein said leader holder assembly is molded unitarily including the support panel.

16. The apparatus of claim 15 and releasable fastener means on the panel for cooperation with another surface for releasably fastening the support panel in a selected location.

17. The apparatus of claim 16 wherein said another surface is a surface of a tackle box.

18. The apparatus of claim 16 wherein the fastener means comprises a first fastener portion on the support panel, and second fastener portion fixed on both inner and outer surfaces of a cover of a fishing tackle box.

* * * * *